(12) United States Patent
Terada et al.

(10) Patent No.: US 10,914,376 B2
(45) Date of Patent: Feb. 9, 2021

(54) AUTOMATIC TRANSMISSION

(71) Applicant: AISIN AW CO., LTD., Anjo (JP)

(72) Inventors: Keisuke Terada, Toyota (JP); Masaru Katsuya, Anjo (JP); Takao Fukui, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 100 days.

(21) Appl. No.: 16/310,653

(22) PCT Filed: Aug. 10, 2017

(86) PCT No.: PCT/JP2017/029109
§ 371 (c)(1),
(2) Date: Dec. 17, 2018

(87) PCT Pub. No.: WO2018/043092
PCT Pub. Date: Mar. 8, 2018

(65) Prior Publication Data
US 2019/0178377 A1  Jun. 13, 2019

(30) Foreign Application Priority Data

Sep. 2, 2016  (JP) ................................ 2016-172265

(51) Int. Cl.
*F16H 63/30* (2006.01)
*F16D 25/0638* (2006.01)
(Continued)

(52) U.S. Cl.
CPC ..... *F16H 63/3026* (2013.01); *F16D 25/0638* (2013.01); *F16D 25/10* (2013.01);
(Continued)

(58) Field of Classification Search
CPC .......................... F16H 63/3026; F16H 57/043
See application file for complete search history.

(56) References Cited

U.S. PATENT DOCUMENTS

| | | | | | |
|---|---|---|---|---|---|
| 2,632,544 | A | * | 3/1953 | Hockert | F16H 63/3026 192/48.613 |
| 3,162,063 | A | * | 12/1964 | Konrad | F16H 63/3026 475/119 |
| 3,265,175 | A | * | 8/1966 | Croswhite | F16H 47/08 192/48.614 |
| 3,470,770 | A | * | 10/1969 | Fisher | F16H 59/16 475/126 |

(Continued)

FOREIGN PATENT DOCUMENTS

JP  H02-296072 A  12/1990
JP  2015-117775 A  6/2015
(Continued)

OTHER PUBLICATIONS

Sep. 19, 2017 Search Report issued in International Patent Application No. PCT/JP2017/029109.

*Primary Examiner* — Terence Boes
(74) *Attorney, Agent, or Firm* — Oliff PLC (57) ABSTRACT

An automatic transmission that includes a lubricating oil supply source that supplies lubricating oil; a plurality of friction engagement elements that can attain a plurality of shift speeds according to combinations of the friction engagement elements to be engaged simultaneously; a plurality of hydraulic servos that engage and disengage the plurality of friction engagement elements according to whether an oil pressure is supplied thereto or not; and a rotary shaft that can transmit power.

13 Claims, 5 Drawing Sheets

(51) Int. Cl.
*F16D 25/12* (2006.01)
*F16D 25/10* (2006.01)
*F16H 57/04* (2010.01)
*F16H 61/00* (2006.01)
*F16H 61/30* (2006.01)
*F16H 3/66* (2006.01)

(52) U.S. Cl.
CPC .......... *F16D 25/12* (2013.01); *F16H 57/043* (2013.01); *F16H 57/0446* (2013.01); *F16H 61/0021* (2013.01); *F16H 61/30* (2013.01); *F16H 3/663* (2013.01); *F16H 2061/0037* (2013.01); *F16H 2063/303* (2013.01); *F16H 2200/006* (2013.01); *F16H 2200/0086* (2013.01); *F16H 2200/201* (2013.01); *F16H 2200/2046* (2013.01); *F16H 2200/2066* (2013.01); *F16H 2200/2082* (2013.01)

(56) References Cited

U.S. PATENT DOCUMENTS

| | | | | |
|---|---|---|---|---|
| 5,470,284 | A | * | 11/1995 | Taniguchi ................. F16H 3/64 475/204 |
| 2007/0151826 | A1 | * | 7/2007 | Ishii ..................... F16D 65/186 192/221 |
| 2015/0323060 | A1 | | 11/2015 | Torii et al. |
| 2018/0080352 | A1 | * | 3/2018 | Patel ................... F16H 57/0471 |
| 2019/0063589 | A1 | * | 2/2019 | Pydin ................... F16H 57/043 |

FOREIGN PATENT DOCUMENTS

| | | |
|---|---|---|
| JP | 2016-61304 A | 4/2016 |
| JP | 2016-84862 A | 5/2016 |
| WO | 2014/077408 A1 | 5/2014 |

* cited by examiner

|   | C1 | C2 | C3 | C4 | B1 | B2 | F1 |
|---|---|---|---|---|---|---|---|
| 1ST | ○ | | | | | (○) | ○ |
| 2ND | ○ | | | | ○ | | |
| 3RD | ○ | | ○ | | | | |
| 4TH | ○ | | | ○ | | | |
| 5TH | ○ | ○ | | | | | |
| 6TH | | ○ | | ○ | | | |
| 7TH | | ○ | ○ | | | | |
| 8TH | | ○ | | | ○ | | |
| Rev1 | | | ○ | | | ○ | |
| Rev2 | | | | ○ | | ○ | |

AUTOMATIC TRANSMISSION

BACKGROUND

The present disclosure relates to automatic transmissions that are mounted on, e.g., vehicles such as automobiles.

For example, multi-stage automatic transmissions including a plurality of friction engagement elements such as clutches and brakes and capable of attaining a plurality of shift speeds according to the combinations of the friction engagement elements to be engaged simultaneously are conventionally widely used as automatic transmissions that are preferably used for vehicles. Regarding such automatic transmissions, an automatic transmission having a lubricating path, through which lubricating oil is supplied radially outward from a central shaft placed in the rotation center of movable parts such as clutches, brakes, or planetary gears, in order to supply lubricating oil to the movable parts is known in the art (see Japanese Patent Application Publication No. 2016-61304). In this automatic transmission, a linear oil passage (hole) having a constant inner diameter is formed in the central shaft in the axial direction.

In this automatic transmission, lubricating oil is also supplied to, e.g., canceling oil chambers of hydraulic servos of the clutches. For example, when hydraulic oil is discharged from a hydraulic oil chamber of the clutch, a centrifugal oil pressure in the hydraulic oil chamber is cancelled by the lubricating oil in the canceling oil chamber, and a piston member is moved rearward by the biasing force of a return spring, whereby friction plates are disengaged.

SUMMARY

However, the automatic transmission described in Japanese Patent Application Publication No. 2016-61304 may have the following problem because the oil passage formed in the central shaft has a linear shape with a constant inner diameter. For example, the accelerator pedal may be depressed and the vehicle may make a sudden start or experience sudden acceleration while the vehicle is stopped for idle reduction. In this case, a first forward speed is attained as a shift speed, and for example, a second clutch for medium to high shift speeds therefore remains disengaged. At this time, hydraulic oil has not been completely discharged from a hydraulic oil chamber of the second clutch and a part of the hydraulic oil thus remains in the hydraulic oil chamber. Unlike in the hydraulic oil chamber, lubricating oil has been discharged from a canceling oil chamber of the second clutch which does not have a check valve etc.

When a drum of the second clutch also starts rotating suddenly due to the sudden acceleration, a centrifugal oil pressure is generated in the hydraulic oil chamber before a sufficient amount of lubricating oil is supplied from the central shaft to the canceling oil chamber. However, a sufficient canceling force is not generated in the canceling oil chamber due to the insufficient amount of lubricating oil in the canceling oil chamber. Accordingly, a piston slides in the direction in which the clutch is engaged. Since this sliding force is small, the clutch is not fully engaged, but dragging between the friction plates may be caused, resulting in heat generation or wear. In order to solve this problem, it is desired to quickly fill the canceling oil chamber with lubricating oil in preference to other parts to which the lubricating oil is to be supplied when the central shaft starts rotating. This is not limited to the second clutch. The canceling oil chamber of any other friction engagement element may also be desired to be quickly filled with lubricating oil in preference to other parts to which the lubricating oil is to be supplied when the central shaft starts rotating.

An exemplary aspect of the disclosure provides an automatic transmission that, when it starts being driven, quickly fills a canceling oil chamber of a hydraulic servo of any one of friction engagement elements with lubricating oil in preference to other parts to which the lubricating oil is to be supplied and thus can restrain dragging between friction plates of that friction engagement element.

An automatic transmission according to the present disclosure includes: a lubricating oil supply source that supplies lubricating oil; a plurality of friction engagement elements that can attain a plurality of shift speeds according to combinations of the friction engagement elements to be engaged simultaneously; a plurality of hydraulic servos that engage and disengage the plurality of friction engagement elements according to whether an oil pressure is supplied thereto or not; a rotary shaft that can transmit power; a hole which is formed in the rotary shaft so as to extend in an axial direction from one end of the rotary shaft and to which the lubricating oil is supplied from the lubricating oil supply source at the one end; a first through hole that extends through the hole and a radially outer part of the rotary shaft and that serves to supply the lubricating oil to a canceling oil chamber of a first hydraulic servo of the plurality of hydraulic servos; and a step that is formed in the hole so as to be located on an opposite side of the first through hole from the one end in the axial direction of the rotary shaft and that has a smaller diameter than the one end.

According to this automatic transmission, the step is formed in the hole, which is an oil passage, so as to be located on the opposite side of the first through hole from the one end and has a smaller diameter than the one end. The flow of lubricating oil supplied through the one end is first stopped by the step. The lubricating oil whose flow has been stopped by the step is discharged through the first through hole. This ensures that a sufficient amount of lubricating oil is supplied to the canceling oil chamber of the first hydraulic servo through the first through hole especially in the case where a sufficient amount of lubricating oil has not been supplied to the rotary shaft immediately after the start of driving of the automatic transmission. Supply of lubricating oil can thus be increased as compared to the case where there is no step. Accordingly, when the automatic transmission starts being driven, the canceling oil chamber of the hydraulic servo of the first friction engagement element is quickly filled with lubricating oil in preference to other parts to which the lubricating oil is to be supplied. This restrains dragging between friction plates of the friction engagement element.

DETAILED DESCRIPTION OF EMBODIMENTS

An embodiment will be described below with reference to FIGS. 1 to 4B. An automatic transmission 1 of the present embodiment is an automatic transmission that is preferably mounted on vehicles such as, e.g., front engine, front drive (FF) vehicles. The lateral direction in FIGS. 1 and 3 corresponds to the lateral direction (or the opposite lateral direction) in the state where the automatic transmission 1 is actually mounted on a vehicle. For convenience of description, the right side in the figures, which is the driving source side such as the engine side, is referred to as the "front side," and the left side in the figures is referred to as the "rear side."

[General Configuration of Automatic Transmission]

Figure 1:
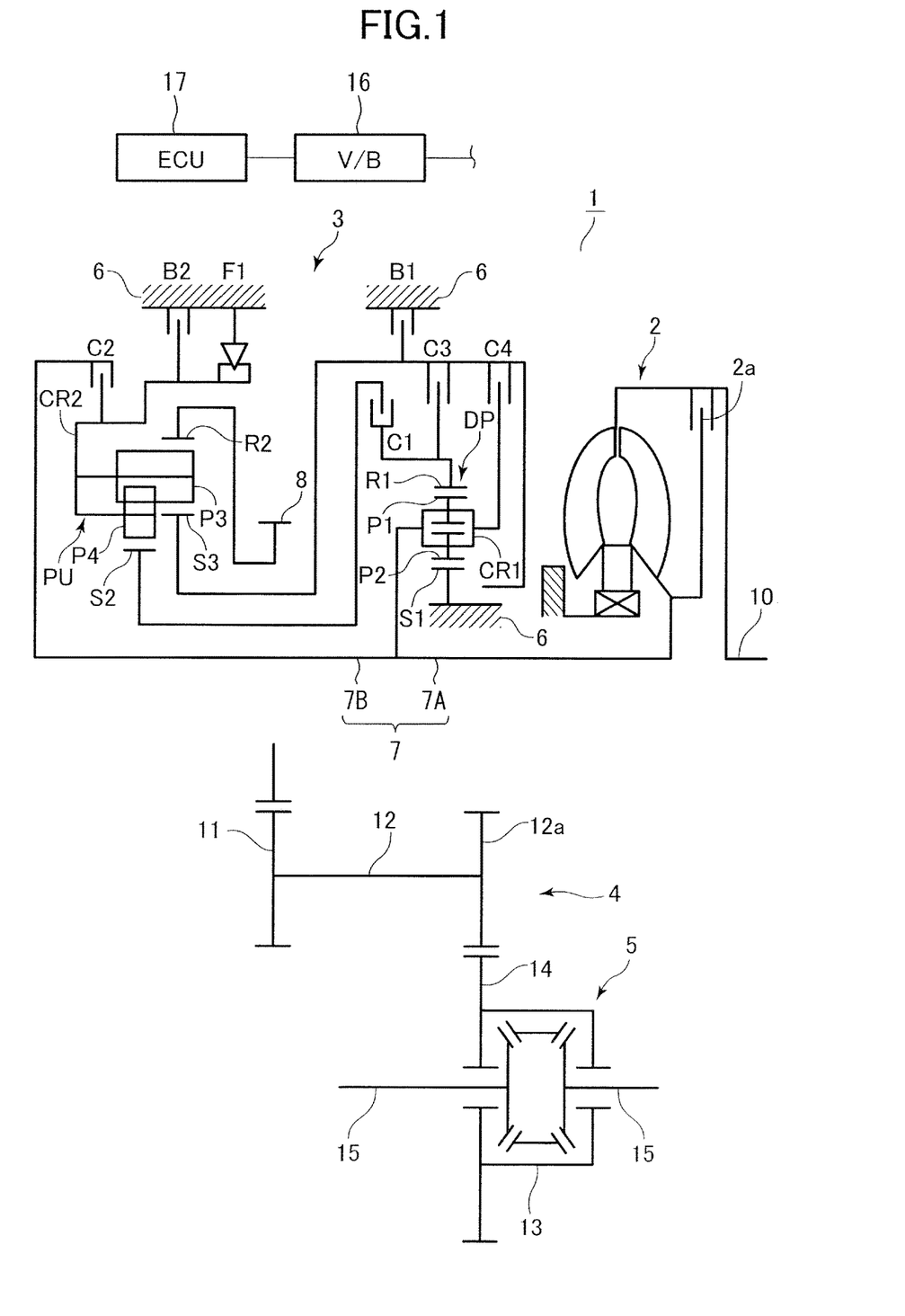
FIG. 1 is a skeleton diagram of an automatic transmission according to an embodiment.

First, the general configuration of the automatic transmission 1 will be described with reference to FIG. 1. As shown in FIG. 1, in the automatic transmission 1 that is preferably used in, e.g., FF vehicles, a torque converter (fluid coupling) 2 having a lockup clutch 2a is placed on the front side, a speed change mechanism 3, a countershaft portion 4, and a differential portion 5 are placed on the rear side.

The torque converter 2 is placed on an axis about an input shaft 7A of the speed change mechanism 3 which is coaxial with, e.g., an output shaft 10 of an engine (not shown) serving as a driving source. The speed change mechanism 3 is placed on an axis about the input shaft 7A and a central shaft (rotary shaft) 7B coaxially connected to the input shaft 7A. In the present embodiment, the input shaft 7A and the central shaft 7B together serve as a transmission shaft 7. At the joint between the input shaft 7A and the central shaft 7B, the front end of the central shaft 7B is fitted and joined to a columnar recess formed in the rear end of the input shaft 7A. Clearance 7s (see FIG. 3), which is surrounded space, is provided between the front end of the central shaft 7B and the bottom surface of the recess of the input shaft 7A. The countershaft portion 4 is placed on a countershaft 12 that is placed on an axis parallel to the transmission shaft 7. The differential portion 5 is placed so as to have right and left drive shafts 15, 15 on an axis parallel to the countershaft 12.

The skeleton diagram of FIG. 1 shows the automatic transmission 1 in a planar developed view, and the transmission shaft 7, the countershaft 12, and the right and left drive shafts 15, 15 are positioned in a triangle as viewed from the side.

The speed change mechanism 3 includes a planetary gear DP and a planetary gear unit PU on the transmission shaft 7. The speed change mechanism 3 has a plurality of friction engagement elements that can attain a plurality of shift speeds according to the combinations of the friction engagement elements to be engaged simultaneously, and a plurality of hydraulic servos that engage and disengage the plurality of friction engagement elements according to whether an oil pressure is supplied thereto or not.

The planetary gear DP is what is called a double-pinion planetary gear that includes a first sun gear S1, a first carrier CR1, and a first ring gear R1 and that has, on the first carrier CR1, a pinion gear P2 meshing with the first sun gear S1 and a pinion gear P1 meshing with the first ring gear R1 such that the pinion gears P1, P2 mesh with each other. The planetary gear unit PU is what is called a Ravigneaux type planetary gear that has, as four rotary elements, a second sun gear S2, a third sun gear S3, a second carrier CR2, and a second ring gear R2 and that has, on the second carrier CR2, a short pinion gear P4 meshing with the second sun gear S2 and a long pinion gear P3 meshing with the third sun gear S3, the short pinion gear P4, and the second ring gear R2.

The first sun gear S1 of the planetary gear DP is held stationary with respect to a case 6. The first carrier CR1 is connected to the input shaft 7A and makes the same rotation (hereinafter referred to as the "input rotation") as that of the input shaft 7A, and is connected to a fourth clutch (friction engagement element) C4. The first ring gear R1 makes reduced rotation, namely rotation reduced in speed from the input rotation, by the first sun gear S1 that is held stationary and the first carrier CR1 that makes the input rotation. The first ring gear R1 is connected to a first clutch C1 and a third clutch C3 which are friction engagement elements.

The third sun gear S3 of the planetary gear unit PU is connected to a first brake (friction engagement element) B1, so that the third sun gear S3 can be held stationary with respect to the case 6. The third sun gear S3 is also connected to the fourth clutch C4 and the third clutch C3, so that the third sun gear S3 can receive the input rotation of the first carrier CR1 via the fourth clutch C4 and can receive the reduced rotation of the first ring gear R1 via the third clutch C3. The second sun gear S2 is connected to the first clutch C1, so that the second sun gear S2 can receive the reduced rotation of the first ring rear R1.

The second carrier CR2 is connected to a second clutch (friction engagement element) C2 that receives rotation of the central shaft 7B, so that the second carrier CR2 can receive the input rotation via the second clutch C2. The second carrier CR2 is also connected to a first one-way clutch F1 and a second brake (friction engagement element) B2, so that rotation of the second carrier CR2 in one direction relative to the case 6 is restricted via the first one-way clutch F1 and the second carrier CR2 can be held stationary (can be stopped) with respect to the case 6 via the second brake B2. The second ring gear R2 is connected to a counter gear 8.

A counter driven gear 11 that is fixed to the countershaft 12 of the countershaft portion 4 meshes with the counter gear 8. A gear 14 of the differential portion 5 meshes with the countershaft 12 via an output gear 12a formed on the outer peripheral surface of the countershaft 12. The gear 14 is fixed to a differential gear 13 and is connected to the right and left drive shafts 15, 15 via the differential gear 13.

Figure 2:
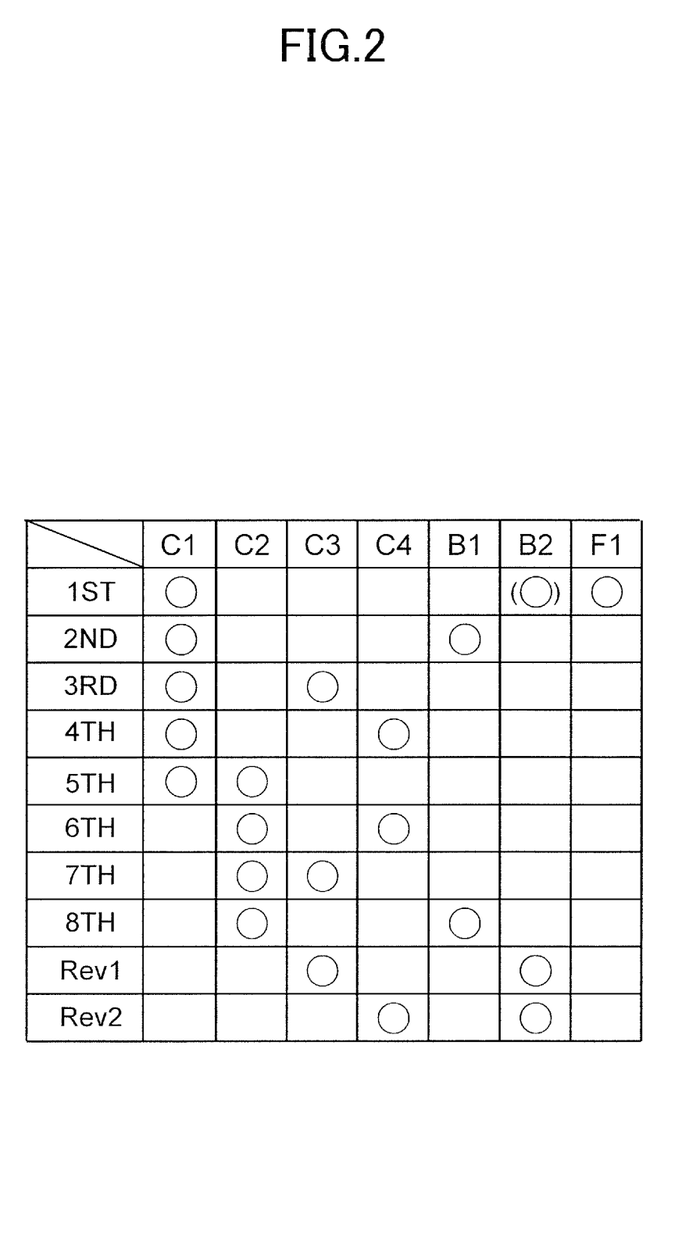
FIG. 2 is an engagement table of the automatic transmission according to the embodiment.

The automatic transmission 1 configured as described above attains first (1st) to eighth (8th) forward speeds and first (Rev1) and second (Rev2) reverse speeds by controlling engagement or disengagement of the first to fourth clutches C1 to C4, the first and second brakes B1, B2, and the one-way clutch F1 in the skeleton diagram of FIG. 1 according to the combinations shown in the engagement table of FIG. 2. The present embodiment is described with respect to the automatic transmission 1 that attains the first and second reverse speeds. However, the automatic transmission 1 may be designed to use only the first reverse speed and not to use the second reverse speed. In FIG. 2, "○" shows the friction engagement element to be engaged when an engine brake is in operation.

The automatic transmission 1 includes a hydraulic control device (V/B, a lubricating oil supply source) 16 and an ECU (control device) 17. The hydraulic control device 16 is formed by, e.g., a valve body, and can generate a line pressure etc. from an oil pressure supplied from an oil pump and permit and cut off supply of oil pressures or lubricating oil serving as engagement pressures that control the first to fourth clutches C1 to C4, the first and second brakes B1, B2, and the lockup clutch 2a based on control signals from the ECU 17.

Figure 5:
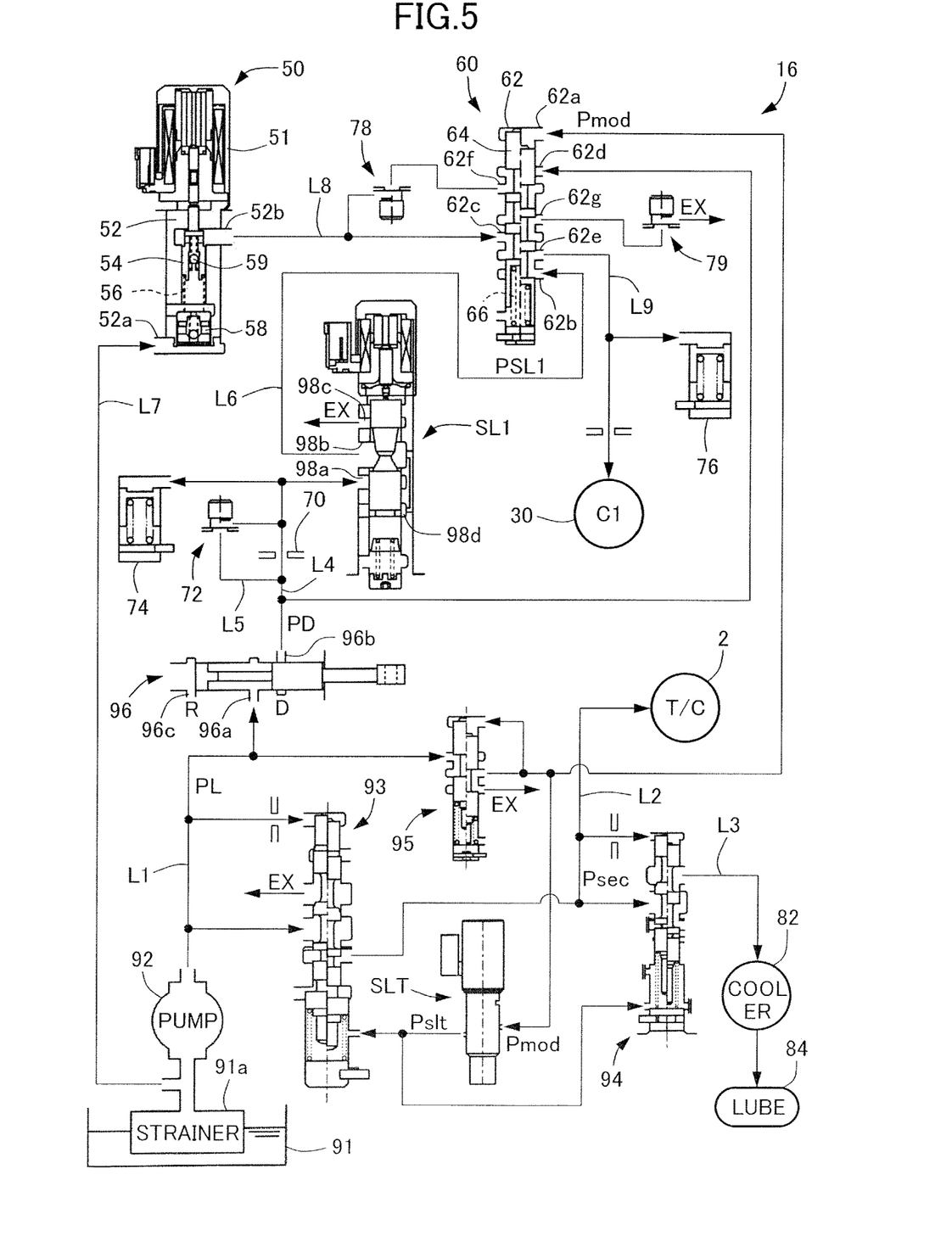
FIG. 5 is a hydraulic circuit diagram of a hydraulic control device of the automatic transmission according to the embodiment.

The hydraulic control device 16 of the present embodiment will be described based on the hydraulic circuit diagram of FIG. 5. The hydraulic control device 16 includes a mechanical oil pump 92, a primary regulator valve 93, a secondary regulator valve 94, a modulator valve 95, a linear solenoid valve SLT, a manual valve 96, a linear solenoid valve SL1, an electromagnetic pump 50, and a switch valve 60. With the power from the engine, not shown, the mechanical oil pump 92 sucks hydraulic oil from an oil pan 91 through a strainer 91a and pumps the hydraulic oil into a line pressure oil passage L1. The primary regulator valve 93 regulates the oil pressure in the line pressure oil passage L1 to generate a line pressure PL and outputs an exhaust pressure to a secondary pressure oil passage L2. The secondary regulator valve 94 regulates the oil pressure in the secondary pressure oil passage L2 to generate a secondary pressure Psec and outputs an exhaust pressure to a secondary exhaust pressure oil passage L3. The modulator valve 95 reduces the line pressure PL to generate a modulator pressure Pmod. The linear solenoid valve SLT regulates the modulator pressure Pmod from the modulator valve 95 to generate a signal pressure Pslt for operating the primary regulator valve 93 and the secondary regulator valve 94. The primary regulator valve 93 and the secondary regulator valve 94 are formed as control valves that feed their output pressures back to themselves to regulate the line pressure PL and the secondary pressure Psec, respectively.

The manual valve 96 has an input port 96a that receives the line pressure PL, a D-pressure output port 96b, and an R-position output port 96c, etc. and permits and cuts off communication between associated ports according to the operation of a shift lever. The linear solenoid valve SL1 regulates a forward range pressure PD (line pressure PL) from a D-pressure oil passage L4 connected to the D-pressure output port 96b of the manual valve 96 and outputs the resultant oil pressure to an output pressure oil passage L6. The electromagnetic pump 50 sucks hydraulic oil through a suction oil passage L7 connected to the strainer 91a of the oil pan 91 and discharges the hydraulic oil into a discharge pressure oil passage L8. The switch valve 60 switches to permit either communication between the output pressure oil passage L6 and a clutch oil passage L9 connected to a hydraulic servo 30 of the first clutch C1 or communication between the discharge pressure oil passage L8 and the clutch oil passage L9.

The secondary pressure oil passage L2 communicates with the torque converter 2, and the secondary pressure Psec is used as a supply pressure for supplying hydraulic oil to be circulated in a torus of the torque converter 2 and is used as a control pressure for engaging the lockup clutch. The secondary exhaust pressure oil passage L3 communicates with a cooler 82 that cools hydraulic oil and a lubrication system 84 such as gears and bearings. Hydraulic oil that is pumped into the secondary discharge pressure is cooled by the cooler 82 and is then used as lubricating oil that lubricates the lubrication system 84. The lubrication system 84 includes a canceling oil chamber 37 of the hydraulic servo (second hydraulic servo) 30 of the first clutch C1 and a canceling oil chamber 27 of a hydraulic servo (first hydraulic servo) 20 of the second clutch C2 (see FIG. 3) which will be described later.

The linear solenoid valve SL1 is configured as a direct control linear solenoid valve which has an input port 98a connected to the D-pressure oil passage L4, an output port 98b connected to the output pressure oil passage L6, a drain port 98c, and a feedback port 98d that provides feedback from an output pressure PSL1, and which generates an optimal clutch pressure from the forward range pressure PD and directly controls the first clutch C1. The D-pressure oil passage L4 connected to the input port 98a has an orifice 70, and an accumulator 74 that accumulates the forward range pressure PD is connected between the orifice 70 and the input port 98a. A bypass oil passage L5 is connected to the D-pressure oil passage L4 so as to bypass the orifice 70, and a pressure relief valve 72 is attached to the bypass oil passage L5. The pressure relief valve 72 is attached to allow the flow of hydraulic oil from the D-pressure output port 96b of the manual valve 96 to the input port 98a of the linear solenoid valve SL1 and to block the flow of hydraulic oil in the opposite direction.

The electromagnetic pump 50 includes an electromagnetic portion 51 that generates an electromagnetic force when a current is applied to a coil, a hollow cylindrical cylinder 52 having a suction port 52a and a discharge port 52b, a columnar piston 54 that is pressed by the electromagnetic force from the electromagnetic portion 51 to slide within the cylinder 52, a spring 56 that biases the piston 54 in the opposite direction to that in which the electromagnetic force presses the piston 54, a suction check valve 58 that is contained in the cylinder 52 and allows the flow of hydraulic oil into the cylinder 52 through the suction port 52a and blocks the flow of hydraulic oil out of the cylinder 52 in the opposite direction through the suction port 52a, and a discharge check valve 59 that is contained in the piston 54 and allows the flow of hydraulic oil out of the cylinder 52 through the discharge port 52b and blocks the flow of hydraulic oil into the cylinder 52 in the opposite direction through the discharge port 52b. The electromagnetic pump 50 pumps hydraulic oil by reciprocating the piston 54 by intermittent application of a current to the coil. In the electromagnetic pump 50, the suction port 52a is connected to the suction oil passage L7, and the discharge port 52b is connected to the discharge pressure oil passage L8.

The switch valve 60 includes a hollow cylindrical sleeve 62, a columnar spool 64 that slides within the sleeve 62 to permit and cut off communication between associated ports, and a spring 66 that biases the spool 64. The sleeve 62 has a signal pressure port 62a, input ports 62b, 62c, 62d, output ports 62e, 62f, and a drain port 62g. The signal pressure port 62a is a port that receives a signal pressure for pressing the spool 64 in the opposite direction to that in which the spring 66 biases the spool 64. In this example, the signal pressure port 62a receives the modulator pressure Pmod. The input port 62b is connected to the output pressure oil passage L6 from the linear solenoid valve SL1, the input port 62c is connected to the discharge pressure oil passage L8 from the electromagnetic pump 50, the input port 62d is connected to the D-pressure oil passage L4, and the output port 62e is connected to the clutch oil passage L9. A damper 76 is connected to the clutch oil passage L9. The output port 62f is connected to the discharge pressure oil passage L8 through a pressure relief valve 78. The pressure relief valve 78 is attached to allow the flow of hydraulic oil from the output port 62f into the discharge pressure oil passage L8 and to block the flow of hydraulic oil in the opposite direction. A pressure relief valve 79 is connected to the drain port 62g, so that hydraulic oil that flows out from the drain port 62g is discharged through the pressure relief valve 79.

In the switch valve 60, when the modulator pressure Pmod that is input to the signal pressure port 62a is equal to or higher than a set pressure that overcomes the biasing force of the spring 66, the spool 64 moves to the position shown in the right half in the figure while contracting the spring 66, so that the input port 62b communicates with the output port 62e, communication between the input port 62c and the output port 62e is cut off, the input port 62c communicates with the drain port 62g, and communication between the input port 62d and the output port 62f is cut off. The output pressure of the linear solenoid valve SL1 is thus supplied to the hydraulic servo 30 of the first clutch C1 sequentially through the output pressure oil passage L6, the input port 62b and the output port 62e of the switch valve 60, and the clutch oil passage L9, and the residual pressure in the discharge pressure oil passage L8 is discharged through the input port 62c and the drain port 62g of the switch valve 60 and the pressure relief valve 79. When the modulator pressure Pmod that is input to the signal pressure port 62a is lower than the set pressure, the spool 64 moves to the position shown in the left half in the figure while expanding the spring 66, so that communication between the input port 62b and the output port 62e is cut off, the input port 62c communicates with the output port 62e, communication between the input port 62c and the drain port 62g is cut off, and the input port 62d communicates with the output port 62f. The discharge pressure of the electromagnetic pump 50 is thus supplied to the hydraulic servo 30 of the first clutch C1 sequentially through the discharge pressure oil passage L8, the input port 62c and the output port 62e of the switch valve 60, and the clutch oil passage L9.

In a vehicle on which the hydraulic control device 16 of the present embodiment configured as described above is mounted, the engine is automatically turned off if all of preset automatic turn-off conditions, such as the vehicle speed V is 0, the accelerator is off, the brake is on, and the engine has been idling for a predetermined time, are satisfied while the shift lever is in the D (drive) position. When the engine is automatically turned off, the mechanical oil pump 92 is stopped, and the modulator pressure Pmod that is input to the signal pressure port 62a becomes lower than the set pressure. The switch valve 60 therefore cuts off communication between the output pressure oil passage L6 and the clutch oil passage L9 and allows the discharge pressure oil passage L8 to communicate with the clutch oil passage L9. Accordingly, an oil pressure can be applied to the hydraulic servo 30 through the clutch oil passage L9 by driving the electromagnetic pump 50 to discharge hydraulic oil to the discharge pressure oil passage L8. In the present embodiment, the electromagnetic pump 50 is driven so that an oil pressure required to keep a piston member 33 (see FIG. 3) of the first clutch C1 at a position close to the stroke end is applied to the hydraulic servo 30.

When predetermined automatic start conditions such as the brake is off are satisfied while the engine is automatically off, the engine is automatically restarted. When the engine is automatically restarted, the mechanical oil pump 92 is restarted, whereby the line pressure PL rises and the modulator pressure Pmod that is applied to the signal pressure port 62a becomes equal to or higher than the set pressure. The switch valve 60 therefore allows the output pressure oil passage L6 to communicate with the clutch oil passage L9 and cuts off communication between the discharge pressure oil passage L8 and the clutch oil passage L9. Accordingly, by outputting hydraulic oil pumped from the mechanical oil pump 92 to the output pressure oil passage L6 through the linear solenoid valve SL1, an SL1 pressure can be applied to the hydraulic servo 30 through the clutch oil passage L9, and the first clutch C1 can be engaged by the SL1 pressure. As described above, while the engine is automatically off, the electromagnetic pump 50 is driven to apply an oil pressure (stroke end pressure) to the hydraulic servo 30, and the vehicle is put on standby in this state. The first clutch C1 can thus be quickly engaged immediately after the engine is automatically restarted. The vehicle can therefore be started smoothly.

[Rear Part Structure of Automatic Transmission]

Next, the structure of the rear part of the speed change mechanism 3 of the automatic transmission 1 will be described in detail with reference to FIG. 3. The speed change mechanism 3 has the central shaft 7B in its central part. The front part of the central shaft 7B is rotatably supported by the input shaft 7A or a center support portion 9 supported by the case 6, and the rear part of the central shaft 7B is rotatably supported by a boss portion 6a formed in the case 6.

The Ravigneaux type planetary gear unit PU described above is disposed about the central shaft 7B so as to be located behind the counter gear 8 on the outer periphery of the central shaft 7B. The second sun gear S2 formed in the shape of a sleeve is placed directly on the outer periphery of the central shaft 7B so that the second sun gear S2 can rotate relative to the central shaft 7B. The central shaft 7B has a flange portion 7a formed in the shape of a flange so as to extend radially outward. Axial positioning of the second sun gear S2 relative to the flange portion 7a of the central shaft 7B is restricted, and axial positioning of the second sun gear S2 relative to the third sun gear S3 is also restricted. The third sun gear S3 formed in the shape of a sleeve is placed at a position radially outside the second sun gear S2 so that the third sun gear S3 can rotate relative to the central shaft 7B. The front part of the second sun gear S2 is spline-engaged with a coupling member that is coupled to the third clutch C3 and the fourth clutch C4 described above. The front part of the third sun gear S3 is spline-engaged with a coupling member that is coupled to the first clutch C1 described above. The second carrier CR2 is placed radially outside the second sun gear S2 and the third sun gear S3.

The second clutch C2 is placed near the outer periphery of the rear part of the planetary gear unit PU. As shown in FIGS. 3, 4A, and 4B, the second clutch C2 has friction plates 21 comprised of a plurality of outer friction plates 21a and a plurality of inner friction plates 21b, and the hydraulic servo 20 that is driven to press the friction plates 21 so that the friction plates 21 can be engaged.

The hydraulic servo 20 has a clutch drum 22, a piston member 23, a return plate 24, and a return spring 25, which form a hydraulic oil chamber 26 and the canceling oil chamber 27. The clutch drum 22 is a single-piece member formed by, e.g., welding an inner peripheral member 22A and an outer peripheral member 22B together. The distal end of the inner peripheral member 22A is fixed to the flange portion 7a of the central shaft 7B by, e.g., welding etc., and the inner periphery of the inner peripheral member 22A is supported so that the inner peripheral member 22A can rotate relative to the boss portion 6a of the case 6 via an annular member 81. The outer peripheral member 22B is formed in the shape of a drum so as to extend in the axial direction to a position radially outside the friction plates 21, and the inner periphery of the outer peripheral member 22B is spline-engaged with the outer friction plates 21a. A snap ring 29 is fitted in the distal end of the outer peripheral member 22B, so that forward movement of the friction plates 21 is restricted.

A portion facing the piston member 23 on the front side of the clutch drum 22 is formed as a cylinder that forms the hydraulic oil chamber 26. The piston member 23 is fitted in the inner peripheral member 22A so as to be slidable in the axial direction, and the return plate 24 is disposed in the inner peripheral member 22A so as to be positioned by a snap ring 28. The piston member 23 is placed so as to face the front part of the clutch drum 22 and so as to be movable in the axial direction, so that the oil-tight hydraulic oil chamber 26 is formed between the piston member 23 and the clutch drum 22. The outer peripheral part of the piston member 23 is placed so as to face the friction plates 21. The return spring 25 is disposed in a contracted state between the return plate 24 and the piston member 23 placed behind the return plate 24, and the oil-tight canceling oil chamber 27 is formed between the return plate 24 and the piston member 23. The return plate 24 is constantly biased forward based on the biasing force of the return spring 25. That is, the return plate 24 is held stationary with respect to the clutch drum 22.

When a hydraulic oil pressure is supplied from an oil passage in the case 6 to the hydraulic oil chamber 26 through an oil passage in the annular member 81, the second clutch C2 configured as described above is driven to press the piston member 23 forward against the biasing force of the return spring 25 to engage the friction plates 21, thereby drivingly coupling the clutch drum 22, the central shaft 7B, and the second carrier CR2 in the rotational direction. On the other hand, when a hydraulic oil pressure is discharged from the hydraulic oil chamber 26, a centrifugal oil pressure in the hydraulic oil chamber 26 is cancelled by oil in the canceling oil chamber 27, and the piston member 23 is moved rearward by the biasing force of the return spring 25 to disengage the friction plates 21. The second clutch C2 is disengaged when the first forward speed (starting shift speed) is to be attained, and is placed on the outer periphery of the transmission shaft 7 at a position closest to one end (rear end) in the axial direction of the transmission shaft 7 out of the plurality of friction engagement elements.

The hydraulic servo 30 of the first clutch C1 is placed in front of the center support portion 9. The first clutch C1 includes friction plates 31 comprised of a plurality of outer friction plates and a plurality of inner friction plates, and the hydraulic servo 30 that engages and disengages the friction plates 31. The friction plates 31 are placed radially outside a drum-like member connected to the ring gear R1, and the hydraulic servo 30 is placed radially inside the friction plates 31.

The hydraulic servo 30 has a clutch drum 32, the piston member 33, a return plate 34, and a return spring 35, which form a hydraulic oil chamber 36 and the canceling oil chamber 37. The clutch drum 32 is a single-piece member formed by caulking an inner peripheral member and an outer peripheral member. The clutch drum 32 has a flange portion extending from inside to outside in the radial direction, a drum portion extending from the outer periphery of the flange portion to a position radially outside the friction plates 31, and a hollow shaft portion rotatably supported at its inner periphery by the input shaft 7A.

A cylinder portion that forms the hydraulic oil chamber 36 is formed in a portion facing the piston member 33 on the front side of the flange portion. Splines are formed in the inner periphery of the drum portion, so that the drum portion is spline-engaged with the outer friction plates of the friction plates 31. The hollow shaft portion is supported at its inner periphery by a bearing so as to be rotatable relative to the input shaft 7A, and the piston member 33 is fitted on the hollow shaft portion so as to be slidable in the axial direction. The return plate 34 is disposed so as to be positioned by a snap ring 39.

The piston member 33 is placed in front of the flange portion of the clutch drum 32 so as to face the cylinder portion such that the piston member 33 can move in the axial direction. The oil-tight hydraulic oil chamber 36 is formed between the piston member 33 and the clutch drum 32 by two seal rings. A pressing portion extends from the outer periphery of the piston member 33. The pressing portion is placed so as to face the friction plates 31.

Rearward movement of the return plate 34 is restricted by the snap ring 39 fitted on the hollow shaft portion. The return spring 35 is disposed in a contracted state between the return plate 34 and the piston member 33 placed behind the return plate 34, and the oil-tight canceling oil chamber 37 is formed between the return plate 34 and the piston member 33 by a seal ring. The return plate 34 is constantly biased forward based on the biasing force of the return spring 35. That is, the return plate 34 is held stationary with respect to the clutch drum 32.

When a hydraulic oil pressure is supplied to the hydraulic oil chamber 36 through an oil passage c1 formed in the input shaft 7A, the first clutch C1 configured as described above is driven to press the piston member 33 forward against the biasing force of the return spring 35 to engage the friction plates 31, thereby drivingly coupling the first ring gear R1 and the second sun gear S2 in the rotational direction. On the other hand, when a hydraulic oil pressure is discharged from the hydraulic oil chamber 36, the hydraulic oil pressure is supplied from an oil passage 40 in the central shaft 7B that will be described later to the canceling oil chamber 37 through an oil passage c2. When a hydraulic oil pressure is discharged from the hydraulic oil chamber 36, a centrifugal oil pressure in the hydraulic oil chamber 36 is cancelled by oil in the canceling oil chamber 37, and the piston member 33 is moved rearward by the biasing force of the return spring 35 to disengage the friction plates 31.

As described above, the canceling oil chamber 27 of the hydraulic servo 20 of the second clutch C2 is a part of the lubrication system 84 (see FIG. 5), and lubricating oil cooled by the cooler 82 is supplied to the canceling oil chamber 27. In the hydraulic control device 16 of the present embodiment, however, the electromagnetic pump 50 is not connected to the lubrication system 84. The electromagnetic pump 50 is therefore not connected to the canceling oil chamber 27. Accordingly, no oil pressure is applied to the canceling oil chamber 27 even if the electromagnetic pump 50 is driven while the engine is off for idle reduction. It may therefore take time to fill the canceling oil chamber 27 of the hydraulic servo 20 of the second clutch C2 with an oil pressure when the engine is restarted from idle reduction. The present embodiment solves this problem by the configuration of the central shaft 7B described below.

[Structure of Central Shaft]

Next, the structure of the central shaft 7B will be described in detail. The central shaft 7B can transmit power and has the oil passage (hole) 40, a first through hole 41, a second through hole 42, and a step portion 43.

The oil passage 40 is formed in the central shaft 7B so as to extend in the axial direction from the rear end (one end) of the central shaft 7B, and lubricating oil is supplied to the oil passage 40 through the rear end. In the present embodiment, the oil passage 40 extends through the central shaft 7B, namely extends from the front end to the rear end of the central shaft 7B, in the longitudinal direction of the central shaft 7B. Lubricating oil is supplied from the hydraulic control device 16 to the oil passage 40 through an oil passage c4 at the rear end. The oil passage 40 opens in the front end face of the central shaft 7B and communicates with the clearance 7s in the joint between the central shaft 7B and the input shaft 7A. In the present embodiment, the rear end of the central shaft 7B is the end located on the opposite side from the torque converter 2 in the axial direction of the central shaft 7B.

The first through hole 41 is formed in the rear end of the central shaft 7B so as to extend through the oil passage 40 and the outer part of the central shaft 7B. The first through hole 41 serves to supply lubricating oil through an oil passage c5 to the canceling oil chamber 27 of the hydraulic servo 20 of the second clutch C2. In the present embodiment, the first through hole 41 is formed at a plurality of positions in the circumferential direction, e.g., at three positions at intervals of 120°. The second through hole 42 is formed at a position closer to the front end than the first through hole 41 is, and extends through the oil passage 40 and the outer part of the central shaft 7B. The second through hole 42 serves to supply lubricating oil from the second sun gear S2 to the planetary gear unit PU. The diameter of the second through hole 42 and the number of second through holes 42 can be determined as appropriate based on the amount of lubricating oil to be discharged from the first through holes 41, a desired amount of lubricating oil to be discharged from the second through hole 42, etc.

The step portion 43 is formed in the oil passage 40 at a position closer to the front end than the first through hole 41 is. In the present embodiment, the step portion 43 is located between the first through hole 41 and the second through hole 42. The oil passage 40 is shaped such that the part of the oil passage 40 which is located closer to the front end than the step portion 43 is has a smaller diameter than the part of the oil passage 40 which is located closer to the rear end than the step portion 43 is. The part of the oil passage 40 which is located closer to the front end extends with a constant inner diameter as the oil passage 40 to the front end of the central shaft 7B. The second through hole 42 is thus formed in the part of the oil passage 40 which has the smaller diameter. In the present embodiment, when the central shaft 7B is formed, the oil passage 40 having a smaller inner diameter is first formed so as to extend through the entire central shaft 7B, and the central shaft 7B is then cut from its rear end to increase the diameter of the oil passage 40, thereby forming the step portion 43. The central shaft 7B, the step portion 43, and the inner peripheral part of the oil passage 40 are thus formed integrally. It should be understood that the method for forming the central shaft 7B is not limited to this.

Lubricating oil that has flown from the rear end of the oil passage 40 beyond the step portion 43 flows forward as guided by the oil passage 40, and a part of the lubricating oil is discharged from the radial through holes (e.g., the second through hole 42) formed in the oil passage 40. The remaining lubricating oil that has not been discharged through these through holes is discharged into the clearance 7s from an opening that opens to the front end face of the central shaft 7B. This lubricating oil is then supplied to the canceling oil chamber 37 of the hydraulic servo 30 that engages and disengages the first clutch C1 through the oil passage c2 formed around the clearance 7s.

[Operation of Automatic Transmission]

Operation at the time of starting driving of the automatic transmission 1 described above will be described with reference to FIGS. 4A and 4B. For example, when the vehicle is stopped for idle reduction, the clutches and the brakes are disengaged, and oil pressure supply from the hydraulic control device 16 is stopped. Accordingly, in the second clutch C2, the friction plates 21 are disengaged, and lubricating oil is discharged from the canceling oil chamber 27, but hydraulic oil is not completely discharged from the hydraulic oil chamber 26 and a part of the hydraulic oil remains in the hydraulic oil chamber 26. In the first clutch C1, the friction plates 31 are disengaged, and lubricating oil is discharged from the canceling oil chamber 37, but hydraulic oil is not completely discharged from the hydraulic oil chamber 36 and a part of the hydraulic oil remains in the hydraulic oil chamber 36. When the accelerator pedal is depressed and the vehicle makes a sudden start or experiences sudden acceleration, the first forward speed is attained as a shift speed. At the first forward speed, the ECU 17 operates to keep the second clutch C2 disengaged and to engage the first clutch C1 (see FIG. 2).

As the central shaft 7B suddenly starts rotating due to the sudden acceleration, lubricating oil starts to be gradually supplied from the hydraulic control device 16 to the oil passage 40 of the central shaft 7B. As shown in FIG. 4A, when a small amount of lubricating oil is supplied to the oil passage 40 through the oil passage c4, the flow of the supplied lubricating oil is stopped by the step portion 43, and the lubricating oil is accumulated on the peripheral surface of the part of the oil passage 40 which is located closer to the rear end than the step portion 43 is. This lubricating oil 44a accumulated on the peripheral surface of the oil passage 40 is shown hatched in FIG. 4A. The lubricating oil is therefore discharged through the first through hole 41 located closer to the rear end than the step portion 43 is, and is supplied to the canceling oil chamber 27 of the second clutch C2 through the oil passage c5. In this case, the amount of lubricating oil supplied to the oil passage 40 is small, but the flow of the supplied lubricating oil is stopped by the step portion 43 and therefore the supplied lubricating oil does not flow beyond the step portion 43 toward the front end. This ensures that a sufficient amount of lubricating oil is discharged through the first through hole 41.

Since lubricating oil is thus promptly supplied to the canceling oil chamber 27, a canceling oil pressure that biases the piston member 23 rearward from the canceling oil chamber 27 overcomes a centrifugal oil pressure generated in the hydraulic oil chamber, whereby forward movement of the piston member 23 can be prevented. Accordingly, dragging between the friction plates can be prevented which is caused when lubricating oil fails to be promptly supplied to the canceling oil chamber 27 and the piston member 23 is pressed forward by the centrifugal oil pressure due to an insufficient canceling oil pressure.

Figure 3:
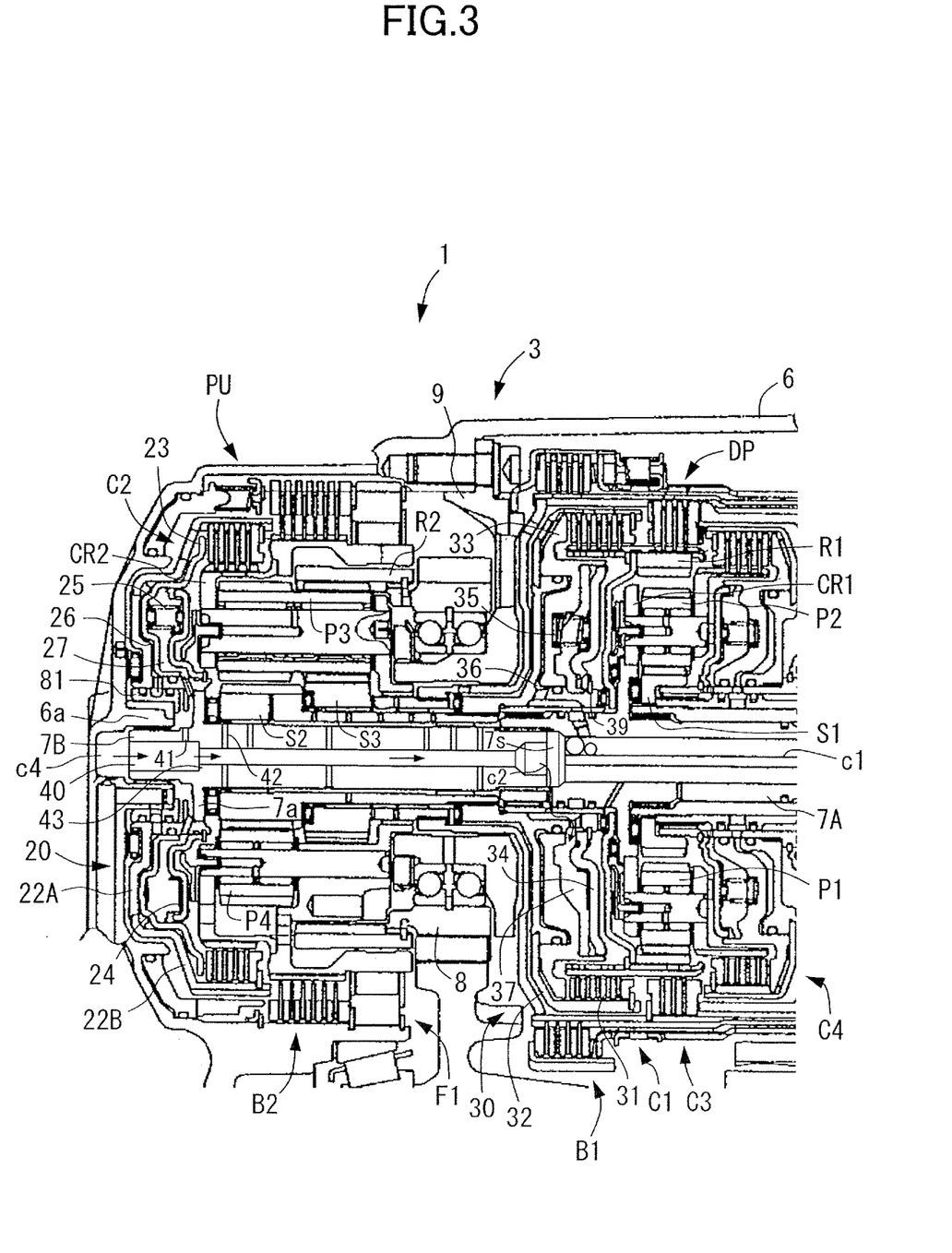
FIG. 3 is a sectional view of a main part of the automatic transmission according to the embodiment.
Figure 4A:
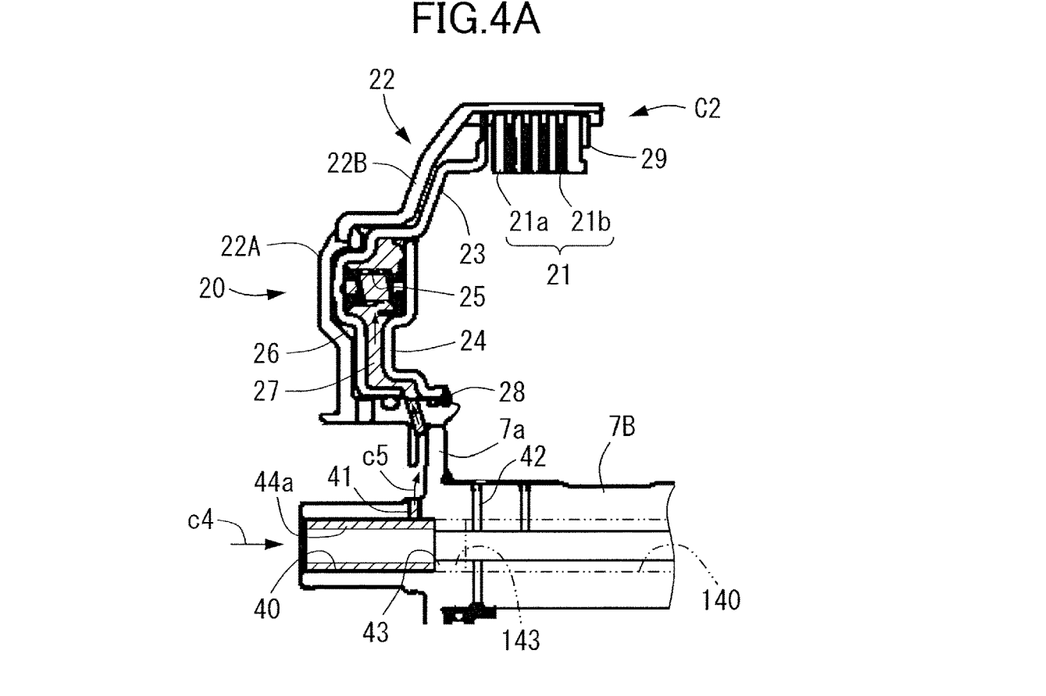
FIG. 4A is a sectional view showing that lubricating oil is being supplied at a low flow rate to a canceling oil chamber of a second clutch of the automatic transmission according to the embodiment.
Figure 4B:
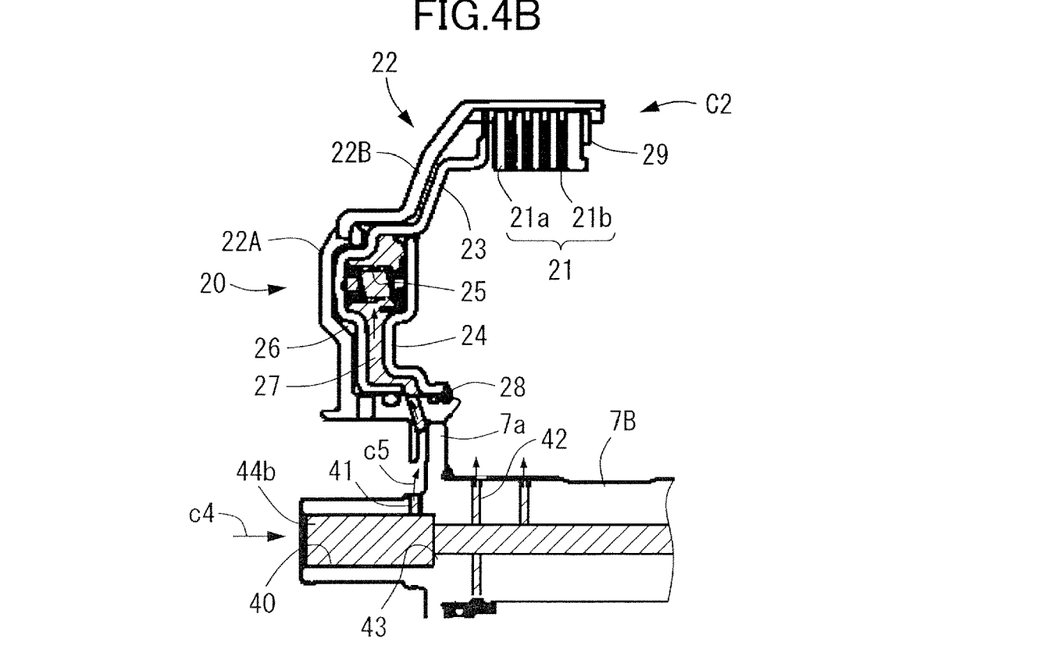
FIG. 4B is a sectional view showing that lubricating oil is being supplied at a high flow rate to the canceling oil chamber of the second clutch of the automatic transmission according to the embodiment.

As shown in FIG. 3, in the first clutch C1, since lubricating oil does not flow in the oil passage c2, no lubricating oil is supplied to the canceling oil chamber 37. Almost no canceling oil pressure is therefore generated. However, since the first clutch C1 is engaged when the first forward speed is to be attained, the canceling oil chamber 37 need not be filled with lubricating oil when rotation is started.

Once supply of lubricating oil from the hydraulic control device 16 has increased sufficiently with time, a sufficient amount of lubricating oil flows in the oil passage 40 of the central shaft 7B as shown in FIG. 4B. This sufficient amount of lubricating oil 44b flowing in the oil passage 40 is shown hatched in FIG. 4B. Accordingly, the lubricating oil supplied from the rear end of the oil passage 40 flows beyond the step portion 43 into the part of the oil passage 40 which is located closer to the front end. Since the second through hole 42 is formed on the part which is located closer to the front end than the step portion 43 is, the lubricating oil is discharged through the second through hole 42 and supplied to the planetary gear unit PU.

The lubricating oil having flown through the oil passage 40 is supplied to the canceling oil chamber 37 of the first clutch C1 through the oil passage c2.

As described above, according to the automatic transmission 1 of the present embodiment, the step portion 43 is formed in the part of the oil passage 40 which is located closer to the front end than the first through hole 41 is, and is shaped to have a smaller diameter than the part of the oil passage 40 which is located closer to the rear end than the step portion 43 is. Accordingly, the flow of lubricating oil supplied from the rear end is first stopped by the step portion 43. The lubricating oil whose flow has been stopped by the step portion 43 is thus discharged through the first through hole 41. This ensures that a sufficient amount of lubricating oil is supplied to the canceling oil chamber 27 of the hydraulic servo 20 through the first through hole 41 especially in the case where a sufficient amount of lubricating oil has not been supplied to the central shaft 7B immediately after the start of driving of the automatic transmission 1 as shown in FIG. 4A. The amount of lubricating oil that is supplied to the canceling oil chamber 27 of the hydraulic servo 20 can thus be increased as compared to the case where there is no step portion 43. Accordingly, when the automatic transmission 1 starts being driven, the canceling oil chamber 27 of the hydraulic servo 20 of the second clutch C2 is quickly filled with lubricating oil in preference to other parts to which lubricating oil is to be supplied. This restrains dragging between the friction plates 21 of the second clutch C2.

According to the automatic transmission 1 of the present embodiment, the first through hole 41 can supply lubricating oil to the canceling oil chamber 27 of the second clutch C2, and the second clutch C2 is disengaged when the first forward speed is attained, and is placed on the outer periphery of the transmission shaft 7 at a position closest to the rear end in the axial direction of the transmission shaft 7 out of the plurality of friction engagement elements. The first through hole 41 can therefore be formed at a position closest to the rear end of the central shaft 7B. The first through hole 41 can therefore be independently formed at a position closer to the rear end than the step portion 43 is. Accordingly, especially when the central shaft 7B starts rotating, no lubricating oil is discharged from any other through holes, and lubricating oil can be efficiently discharged only through the first through hole 41.

According to the automatic transmission 1 of the present embodiment, lubricating oil that has flown from the rear end of the oil passage 40 beyond the step portion 43 is discharged from the front end of the oil passage 40 and is supplied through the oil passage c2 to the canceling oil chamber 37 of the hydraulic servo 30 that engages and disengages the first clutch C1. The first clutch C1 is a clutch that is engaged when the first forward speed is to be attained. Accordingly, a sufficient amount of lubricating oil need not be supplied to the canceling oil chamber 37 when rotation is started. Accordingly, although the amount of lubricating oil that is supplied from the hydraulic control device 16 at the start of rotation is small, this lubricating oil can be intensively supplied to the second clutch C2.

According to the automatic transmission 1 of the present embodiment, when the input shaft 7A rotates, the central shaft 7B always rotates with the input shaft 7A and the hydraulic servo 20 of the second clutch C2 that is disengaged when the starting shift speed is to be attained. Accordingly, when the transmission shaft 7 starts rotating, the first hydraulic servo 20 of the second clutch C2 also rotates therewith, and a centrifugal oil pressure is therefore generated in the hydraulic oil chamber 26 of the hydraulic servo 20 of the second clutch C2. However, the canceling oil chamber 27 is quickly filled with lubricating oil. This restrains dragging between the friction plates 21 of the second clutch C2.

According to the automatic transmission 1 of the present embodiment, the step portion 43 and the inner peripheral part of the oil passage 40 are formed integrally in the central shaft 7B. Accordingly, unlike the case where the step portion is formed in the portion where the input shaft 7A and the central shaft 7B are spline-fitted together, the central shaft 7B and the step portion 43 can be handled as a single-piece member. This facilitates assembly of the automatic transmission 1 etc.

According to the automatic transmission 1 of the present embodiment, the first through hole 41 is formed at a plurality of positions in the circumferential direction, e.g., at three positions at intervals of 120°. Lubricating oil can therefore be efficiently discharged as compared to the case where only one first through hole 41 is formed.

The above embodiment is described with respect to the case where the oil passage 40 is shaped such that the entire part of the oil passage 40 which is located closer to the front end than the step portion 43 is has a smaller diameter. However, the present disclosure is not limited to this. For example, as shown in FIG. 4A, the oil passage may be shaped such that a step portion 143 has a smaller diameter only between the first through hole 41 and the second through hole 42. In this case, an oil passage 140 has the same inner diameter at the rear and front ends of the step portion 143. In this case, for example, the step portion 143 may be formed by fixing a separate ring-shaped member between the first through hole 41 and the second through hole 42 in the oil passage 140 extending through the central shaft 7B, namely extends from the front end to the rear end of the central shaft 7B. Alternatively, instead of using the separate member as the step portion 143, the step portion 143 may be formed by cutting the oil passage 140 from its front and rear ends. In this case as well, the step portion 143 is formed in the part of the oil passage 140 which is located closer to the front end than the first through hole 41 is, and is shaped to have a smaller diameter than the part of the oil passage 140 which is located closer to the rear end than the step portion 143 is. Accordingly, the flow of lubricating oil supplied from the rear end is first stopped by the step portion 143, and effects similar to those described above can be achieved.

The above embodiment is described with respect to the case where the first through hole 41 is the only through hole that is formed in the part of the oil passage 40 which is located closer to the rear end than the step portion 43 is. However, the present disclosure is not limited to this. For example, a through hole other than the first through hole 41 may be formed in the part of the oil passage 40 which is located closer to the rear end than the step portion 43 is. This through hole preferably is a through hole that requires lubricating oil when rotation is started. However, this through hole may be a through hole that does not require lubricating oil when rotation is started.

The above embodiment is described with respect to the case where the first forward speed is used as the starting shift speed. However, the present disclosure is not limited to this. For example, the second forward speed may be used as the starting shift speed. In this case, the canceling oil chamber of the friction engagement element that is disengaged when the second forward speed is to be attained communicates with the first through hole 41.

The present embodiment has at least the following configurations. An automatic transmission (1) of the present embodiment includes: a lubricating oil supply source (16) that supplies lubricating oil; a plurality of friction engagement elements that can attain a plurality of shift speeds according to combinations of the friction engagement elements to be engaged simultaneously; a plurality of hydraulic servos (20, 30) that engage and disengage the plurality of friction engagement elements according to whether an oil pressure is supplied thereto or not; a rotary shaft (7B) that can transmit power; a hole (40) which is formed in the rotary shaft (7B) so as to extend in an axial direction from one end of the rotary shaft (7B) and to which lubricating oil is supplied from the lubricating oil supply source (16) at the one end; a first through hole (41) that extends through the hole (40) and a radially outer part of the rotary shaft (7B) and serves to supply the lubricating oil to a canceling oil chamber (27) of a first hydraulic servo (20) of the plurality of hydraulic servos; and a step portion (43) that is formed in the hole (40) so as to be located on an opposite side of the first through hole (41) from the one end in the axial direction of the rotary shaft (7B) and has a smaller diameter than the one end. With this configuration, the step portion (43) is formed in the hole (40), which is an oil passage, so as to be located on the opposite side of the first through hole (41) from the one end and has a smaller diameter than the one end. The flow of lubricating oil supplied through the one end is first stopped by the step portion (43). The lubricating oil whose flow has been stopped by the step portion (43) is discharged through the first through hole (41). This ensures that a sufficient amount of lubricating oil is supplied to the canceling oil chamber (27) of the first hydraulic servo (20) through the first through hole (41) especially in the case where a sufficient amount of lubricating oil has not been supplied to the rotary shaft (7B) immediately after the start of driving of the automatic transmission (1). The amount of lubricating oil that is supplied to the outside of the rotary shaft (7B) can thus be increased as compared to the case where there is no step portion (43). Accordingly, when the automatic transmission (1) starts being driven, the canceling oil chamber (27) of the hydraulic servo (20) of the first friction engagement element (C2) is quickly filled with the lubricating oil in preference to other parts (C1) to which the lubricating oil is to be supplied. This restrains dragging between friction plates (21) of the friction engagement element (C2).

In the automatic transmission (1) of the present embodiment, the friction engagement element (C2) that is engaged and disengaged by the first hydraulic servo (20) is disengaged when a starting shift speed is to be attained. With this configuration, when the rotary shaft (7B) starts rotating, namely when the starting shift speed is more likely to be attained, a sufficient amount of lubricating oil is supplied to the friction engagement element (C2) that is disengaged when the starting shift speed is to be attained. This restrains dragging between the friction plates (21) of the friction engagement element (C2).

The automatic transmission (1) of the present embodiment further includes: an input shaft (7A) that transmits a driving force of a driving source to the rotary shaft (7B). When the input shaft (7A) rotates, the rotary shaft (7B) always rotates with the input shaft (7A) and the first hydraulic servo (20) of the friction engagement element (C2) that is disengaged when the starting shift speed is to be attained. With this configuration, when the input shaft (7A) and the rotary shaft (7B) start rotating, the first hydraulic servo (20) of the friction engagement element (C2) also rotates therewith, and a centrifugal oil pressure is therefore generated in a hydraulic oil chamber (26) of the first hydraulic servo (20) of the friction engagement element (C2). However, the canceling oil chamber (27) is quickly filled with the lubricating oil. This restrains dragging between the friction plates (21) of the friction engagement element (C2).

In the automatic transmission (1) of the present embodiment, the rotary shaft (7B), the step portion (43), and an inner peripheral part of the hole (40) are formed integrally. With this configuration, for example, unlike the case where the step portion is formed in the portion where the input shaft (7A) and the rotary shaft (7B) are spline-fitted together, the rotary shaft (7B) and the step portion (43) can be handled as a single-piece member. This facilitates assembly of the automatic transmission (1) etc.

In the automatic transmission (1) of the present embodiment, the cancelling oil chamber (27) of the first hydraulic servo (20) is placed at a position closer to the one end of the rotary shaft (7B) than the step portion (43) is in the axial direction of the rotary shaft (7B). With this configuration, the cancelling oil chamber (27) is located closer to the one end than the step portion (43) is, Accordingly, lubricating oil that is discharged through the first through hole (41) when a vehicle makes a sudden start or experiences sudden acceleration flows radially outward due to a centrifugal force. Accordingly, the lubricating oil is supplied to the canceling oil chamber (27) without flowing significantly in the axial direction of the rotary shaft (7B). The canceling oil chamber (27) can thus be efficiently and quickly filled with lubricating oil.

The automatic transmission (1) of the present embodiment further includes: a second through hole (42) formed on an opposite side of the step portion (43) from the first through hole (41) in the axial direction of the rotary shaft (7B) and extending through the hole (40) and the outer part of the rotary shaft (7B). A cancelling oil chamber (37) of a second hydraulic servo (30) that engages and disengages the friction engagement element (C1) that is engaged when the starting shift speed is to be attained communicates with the second through hole (42) and is placed on an opposite side of the step portion (43) from the cancelling oil chamber (27) of the first hydraulic servo (20) in the axial direction of the rotary shaft (7B). With this configuration, lubricating oil is not discharged through the second through hole (42) when the vehicle makes a sudden start or experiences sudden acceleration, but instead can be discharged through the first through hole (41). In the friction engagement element (C1) that is engaged when the starting shift speed is to be attained, the cancelling oil chamber (37) of the second hydraulic servo (30) need not be quickly filled with lubricating oil when the vehicle makes a sudden start or experiences sudden acceleration. Since the cancelling oil chamber (37) of the second hydraulic servo (30) is placed on the opposite side of the step portion (43) from the cancelling oil chamber (27) of the first hydraulic servo (20), the canceling oil chamber (27) of the first hydraulic servo (20) can be more quickly filled with lubricating oil.

The automatic transmission (1) of the present embodiment further includes: a fluid coupling (2) coupled to the rotary shaft (7B). The one end of the rotary shaft (7B) is located on an opposite side from the fluid coupling (2) in the axial direction of the rotary shaft (7B). With this configuration, the one end of the rotary shaft (7B) is located on the opposite side of a case (6) of the automatic transmission (1) from the fluid coupling (2) in the axial direction of the rotary shaft (7B). Accordingly, the one end of the rotary shaft (7B) is located near a wall of the case (6) which is located on the opposite side from the fluid coupling (2). Lubricating oil is thus supplied at a high pressure to the hole (40) through a lubricating oil passage formed in the wall of the case (6). Since the lubricating oil has a high pressure, the canceling oil chamber (27) of the first hydraulic servo (20) can be more quickly filled with the lubricating oil.

In the automatic transmission (1) of the present embodiment, the friction engagement element (C2) that is engaged and disengaged by the first hydraulic servo (20) is placed on an outer periphery of the rotary shaft (7B) at a position closest to the one end in the axial direction out of the plurality of friction engagement elements. With this configuration, the first through hole (41) can be formed at a position closest to the one end of the rotary shaft (7B). The first through hole (41) can therefore be independently formed at a position closer to the one end than the step portion (43) is. Accordingly, especially when the rotary shaft (7B) starts rotating, no lubricating oil is discharged from any other through holes, and lubricating oil can be efficiently discharged only through the first through hole (41).

INDUSTRIAL APPLICABILITY

The automatic transmission according to the present disclosure is preferably used as automatic transmissions that can be mounted on, e.g., vehicles and that particularly switch engagement elements etc. according to whether an oil pressure is supplied or not.

The invention claimed is:

1. An automatic transmission, comprising:
a lubricating oil supply source that supplies lubricating oil;
a plurality of friction engagement elements that can attain a plurality of shift speeds according to combinations of the friction engagement elements to be engaged simultaneously;
a plurality of hydraulic servos that engage and disengage the plurality of friction engagement elements according to whether an oil pressure is supplied thereto or not;
a rotary shaft that can transmit power;
a hole which is formed in the rotary shaft so as to extend in an axial direction from one end of the rotary shaft and to which the lubricating oil is supplied from the lubricating oil supply source at the one end;
a first through hole that extends through the hole and a radially outer part of the rotary shaft and that serves to supply the lubricating oil to a canceling oil chamber of a first hydraulic servo of the plurality of hydraulic servos, the canceling oil chamber being an oil chamber structured to move a friction engagement element of the friction engagement elements towards a disengagement side using oil pressure; and
a step that is formed in the hole so as to be located on an opposite side of the first through hole from the one end in the axial direction of the rotary shaft and that has a smaller diameter than the one end.

2. The automatic transmission according to claim 1, wherein
a friction engagement element of the plurality of friction engagement elements that is engaged and disengaged by the first hydraulic servo is disengaged when a starting shift speed is to be attained.

3. The automatic transmission according to claim 2, further comprising:
an input shaft that transmits a driving force of a driving source to the rotary shaft, wherein
when the input shaft rotates, the rotary shaft always rotates with the input shaft and the first hydraulic servo of the friction engagement element that is disengaged when the starting shift speed is to be attained.

4. The automatic transmission according to claim 3, wherein
the rotary shaft, the step, and an inner periphery of the hole are formed integrally.

5. The automatic transmission according to claim 4, wherein
the cancelling oil chamber of the first hydraulic servo is placed at a position closer to the one end of the rotary shaft than the step is in the axial direction of the rotary shaft.

6. The automatic transmission according to claim 5, further comprising:
a second through hole formed on an opposite side of the step from the first through hole in the axial direction of the rotary shaft and extending through the hole and the outer part of the rotary shaft, wherein
a cancelling oil chamber of a second hydraulic servo that engages and disengages the friction engagement element that is engaged when a starting shift speed is to be attained communicates with the second through hole and that is placed on an opposite side of the step from the cancelling oil chamber of the first hydraulic servo in the axial direction of the rotary shaft.

7. The automatic transmission according to claim 6, further comprising:
a fluid coupling coupled to the rotary shaft, wherein
the one end of the rotary shaft is located on an opposite side from the fluid coupling in the axial direction of the rotary shaft.

8. The automatic transmission according to claim 7, wherein
the friction engagement element that is engaged and disengaged by the first hydraulic servo is placed on an outer periphery of the rotary shaft at a position closest to the one end in the axial direction out of the plurality of friction engagement elements.

9. The automatic transmission according to claim 1, wherein
the rotary shaft, the step, and an inner periphery of the hole are formed integrally.

10. The automatic transmission according to claim 1, wherein
the cancelling oil chamber of the first hydraulic servo is placed at a position closer to the one end of the rotary shaft than the step is in the axial direction of the rotary shaft.

11. The automatic transmission according to claim 10, further comprising:
a second through hole formed on an opposite side of the step from the first through hole in the axial direction of the rotary shaft and extending through the hole and the outer part of the rotary shaft, wherein
a cancelling oil chamber of a second hydraulic servo that engages and disengages a friction engagement element of the plurality of friction engagement elements that is engaged when a starting shift speed is to be attained communicates with the second through hole and that is placed on an opposite side of the step from the cancelling oil chamber of the first hydraulic servo in the axial direction of the rotary shaft.

12. The automatic transmission according to claim 1, further comprising:

a fluid coupling coupled to the rotary shaft, wherein the one end of the rotary shaft is located on an opposite side from the fluid coupling in the axial direction of the rotary shaft.

13. The automatic transmission according to claim 1, wherein a friction engagement element of the plurality of friction engagement elements that is engaged and disengaged by the first hydraulic servo is placed on an outer periphery of the rotary shaft at a position closest to the one end in the axial direction out of the plurality of friction engagement elements.

* * * * *